United States Patent [19]

Jung

[11] 4,102,663
[45] Jul. 25, 1978

[54] METHOD FOR MANUFACTURING HOLLOW AND SOLID INGOTS

[76] Inventor: Lothar Jung, 31 Lurline Dr., Millington, N.J. 07946

[21] Appl. No.: 703,919

[22] Filed: Jul. 9, 1976

[51] Int. Cl.² .................... C03B 23/20; C03B 37/02
[52] U.S. Cl. ............................................ 65/18; 65/144;
264/164; 264/212; 264/310; 427/189; 427/193; 427/194; 427/359
[58] Field of Search ............... 264/293, 284, 310, 164, 264/212; 425/374; 427/471, 189, 184, 190, 193, 194, 223, 318, 359, 360, 365, 422, 423, 425, 427; 65/DIG. 8, DIG. 10, 106, 108, 109, 86, 87, 18, 144

[56] References Cited

U.S. PATENT DOCUMENTS

| | | | |
|---|---|---|---|
| 2,272,342 | 2/1942 | Hyde | 49/78.1 |
| 3,128,166 | 4/1964 | Mohn | 65/18 |
| 3,261,676 | 7/1966 | Morelock | 65/18 |
| 3,275,408 | 9/1966 | Winterburn | 23/182 |
| 3,285,727 | 11/1966 | McGill | 65/109 |
| 3,303,115 | 2/1967 | Nitsche | 204/130 |
| 3,309,188 | 3/1967 | Porter et al. | 65/109 |
| 3,397,732 | 8/1968 | Howell | 427/425 |
| 3,486,870 | 12/1969 | Vervaart et al. | 65/32 |
| 3,741,796 | 6/1973 | Walker | 427/425 X |
| 3,907,536 | 9/1975 | Achener | 427/423 X |

FOREIGN PATENT DOCUMENTS 241,260 1/1912 Fed. Rep. of Germany.

OTHER PUBLICATIONS

Fused Quartz Manufacture In Germany, Office of Military Government For Germany (U.S.), Nov. 1945, Report No. 536.

*Primary Examiner*—Shrive P. Beck
*Attorney, Agent, or Firm*—Lane, Aitken, Dunner & Ziems

[57] ABSTRACT

Disclosed is a method and apparatus for forming hollow and cylindrical ingots of amorphous or fused silica and other ingot materials. The ingot is formed from a melt on a deposition surface which is lowered as the ingot is formed at a rate which maintains a constant distance between the deposition surface and a heat source vertically positioned above same. The melt is shaped into a vertical cylinder by at least one forming tool which is a roller member rotatable about a vertical axis. In a preferred embodiment the fixed distance from the heat source is maintained with the aid of the laser beam.

15 Claims, 4 Drawing Figures

METHOD FOR MANUFACTURING HOLLOW AND SOLID INGOTS

BACKGROUND OF THE INVENTION

1. Field of the Invention

This invention relates to a novel single step method and apparatus for the manufacture of precision shaped hollow and/or solid ingots of various materials. Materials which are desirably formed into ingots include various ceramic and refractory materials, etc. The present invention has proven particularly useful in the production of fused quartz and fused silica ingots. The terms "fused quartz" and "fused silica", are today recognized within industry and science as relating to materials consisting primarily of amorphous $SiO_2$. Such materials are successfully used for a variety of applications molded in the form of tubing, rod, fibers, plates or block material due to their combination of unique properties such as high chemical purity, high temperature and temperature shock resistance and due to their ability to conduct or transmit light waves ranging from ultraviolet to infrared.

2. Prior Art

In the German Herraeus process,[1] ingots (solid only) of comparatively small diameter are produced by spraying fine crystalline quartz powder onto the cylindrical end face of a horizontally disposed, rotating fused quartz holder. However, the outer surface obtained by this prior art process is rough and requires substantial additional rework. In order to produce a useful ingot the lance obtained by this end spray method must be first washed in Hydrofluoric Acid, washed in distilled water and then be dried. Thereafter, it must be reheated in a separate furnace and the diameter is increased by accumulating the material in a larger diameter mold of graphite. Simultaneously, a graphite rod is employed to pierce the hole through the center in order to obtain a hollow ingot. In the German process the surfaces of the ingot will be contaminated with reaction products from the $SiO_2$ and the carbon. Most detrimental is the incorporation of Silicon Carbide SiC. Subsequently, the impurities must be eliminated through mechanically grinding both the outer and the inner surfaces. After this, the ingot is not yet completed, since the surface contamination from the grinding processes, still requires the ingot to be washed again in Hydrofluoric Acid. In doing so, the accurately machined surfaces are often attached by the acid in an unpredictable manner thus destroying the effect of machining. Still another drawback of this method resides in the quartz powder losses resulting from the operation of the flame spray burner which is complex and combines the transportation of the powder with heating.

[1] Malvery J. Gross, "Fused Quartz Manufacture in Germany", Fiat Final Report No. 536, Office of Military Government of Germany (U.S.), pp. 12-21.

In another method, described in U.S. Pat. No. 3,486,870, issued to Vervaart et al. Dec. 30, 1969, employs an expensive rotating molybdenum or tungsten mandrel. The mandrel which is vertically arranged and serves as the starting form for growing hollow fused quartz ingot, is covered with a fused quartz tube and protected with a sheath of inert gases. The disadvantage of this method is that an expensive fused quartz tube must be fitted over the ingot. Another disadvantage of this method is that frequent metal contamination occurs as a result of variations in the flow of protective gases and the temperature. Furthermore, the fact that the metallic mandrel is heated to very high temperatures while in contact with the quartz glass, increases the risk of destruction of the mandrel (by oxidation) beyond repair if a failure in the supply of protective gases occurs. While this older method produces hollow ingots with the above described limitations, provided with bores of accurate diameter, there is little control of the outer diameter. Still another disadvantage of this prior art spray method is that the ingot is started on a quartz glass disc and a quartz glass tube, their weight being added to the melt, thus representing a cost of manufacture which is lost each time such an ingot is produced.

SUMMARY OF THE INVENTION

The present invention provides a method and apparatus for forming solid and hollow ingots from a melt formed on a vertically movable deposition surface. The heat for forming the melt of the ingot material is supplied by a heat source positioned vertically above the deposition surface. At least one forming tool, a roller member rotatable around a vertical axis, is provided for contact with the periphery of the melt to shape a vertical cylindrical surface.

The deposition surface and the heat source are preferably maintained at a constant spaced distance by lowering the deposition surface as the ingot is formed. In a preferred embodiment this is accomplished with the aid of a laser beam established at a fixed distance from the heat source.

To form a hollow ingot a vertically movable lance is employed and the movement of the lance and the forming tool or tools is coordinated so that the lance is positioned within the melt when the forming tool or tools are in contact with the melt.

It is therefore an objective of the present invention, to avoid the disadvantages of the prior art by employing means for forming and accurately controlling both the outer and the inner diameters of hollow and solid ingots, utilizing inexpensive forming tools and a much shorter mandrel as compared to the older methods. Furthermore the risk of contamination has been reduced by applying the forming tools intermittently to the ingot's surface and for a controlled period of time only, thereby keeping them below critical temperatures so that they will not react with the fused quartz material in any detectable way. The result is not only the most desirable accuracy of the ingot dimensions, but also non-contaminated and smooth surfaces which do not require any additional cleaning prior to the drawing of the ingot into tubing, rod or fibre.

It is another object of this invention to provide a method and apparatus for the manufacture of fused quartz or fused silica hollow and/or solid ingots of precision size.

Another objective of this invention is to produce a variety of different fused quartz qualities from the same or from a variety of different raw $SiO_2$ materials. Such differing product qualities may range from optical fused quartz which contains virtually no bubbles to commercial grade fused quartz in which for the sake of certain physical and chemical properties, small quantities of bubbles may be tolerated.

It is a further objective of this invention to regulate the amounts of impurities in the product which may be low or high, as required for the adjustment of certain physical and chemical properties. In particular, this invention aims to produce consistent amounts of hydroxyl groups within each ingot whose concentration may vary from less than 2 to approximately 1,000 PPM.

Still another objective of this invention is to produce ingots with a variety of selected outer and inner diameters and different wall thicknesses for various industrial applications.

It is furthermore an objective of the invention to produce hollow or solid ingots with accurate dimensions on the same apparatus, which ingots are especially suitable for being drawn into tubing, rods or fibres by way of a non-contaminating mandrel and die-free heating process.

Yet another objective is to make the silica raw material supply independent of operation of the heat source.

One more objective of the invention is to avoid all material losses of the starting form. Therefore, a re-usable holder is employed which serves the dual function of both growing the ingot and holding the ingot in the subsequent heating and drawing process. This allow utilization of lower grades of raw materials including silica sand for the one-time manufacture of the holder without contaminating the melt.

Other objects and further scope of applicability of the present invention will become apparent from the detailed description to follow, taken in conjunction with the accompanying drawings.

DESCRIPTION OF THE PREFERRED EMBODIMENTS

Figure 1:
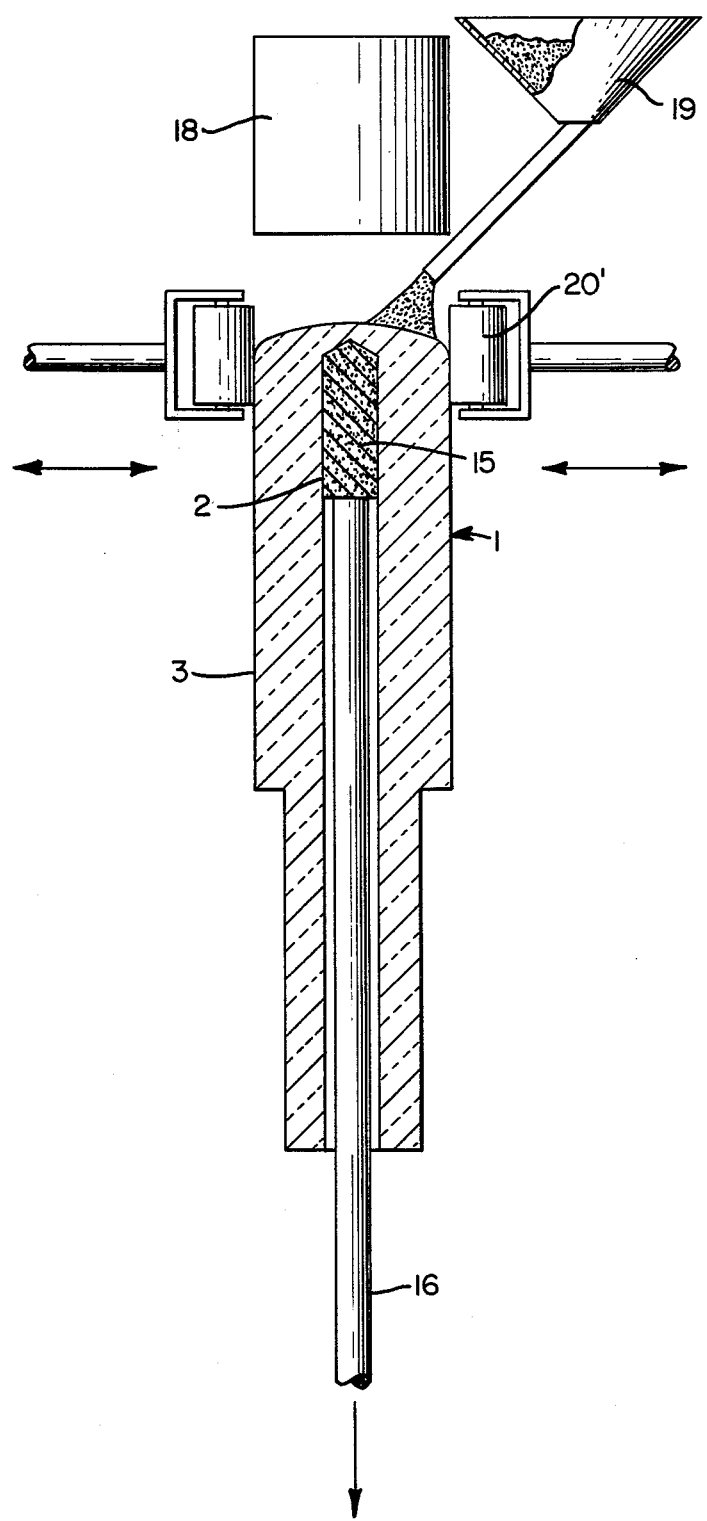
FIG. 1 is a schematic representation illustrating operation of the forming tools and a preferred embodiment wherein the ingot support is a fused quartz or fused silica ingot.
Figure 2:
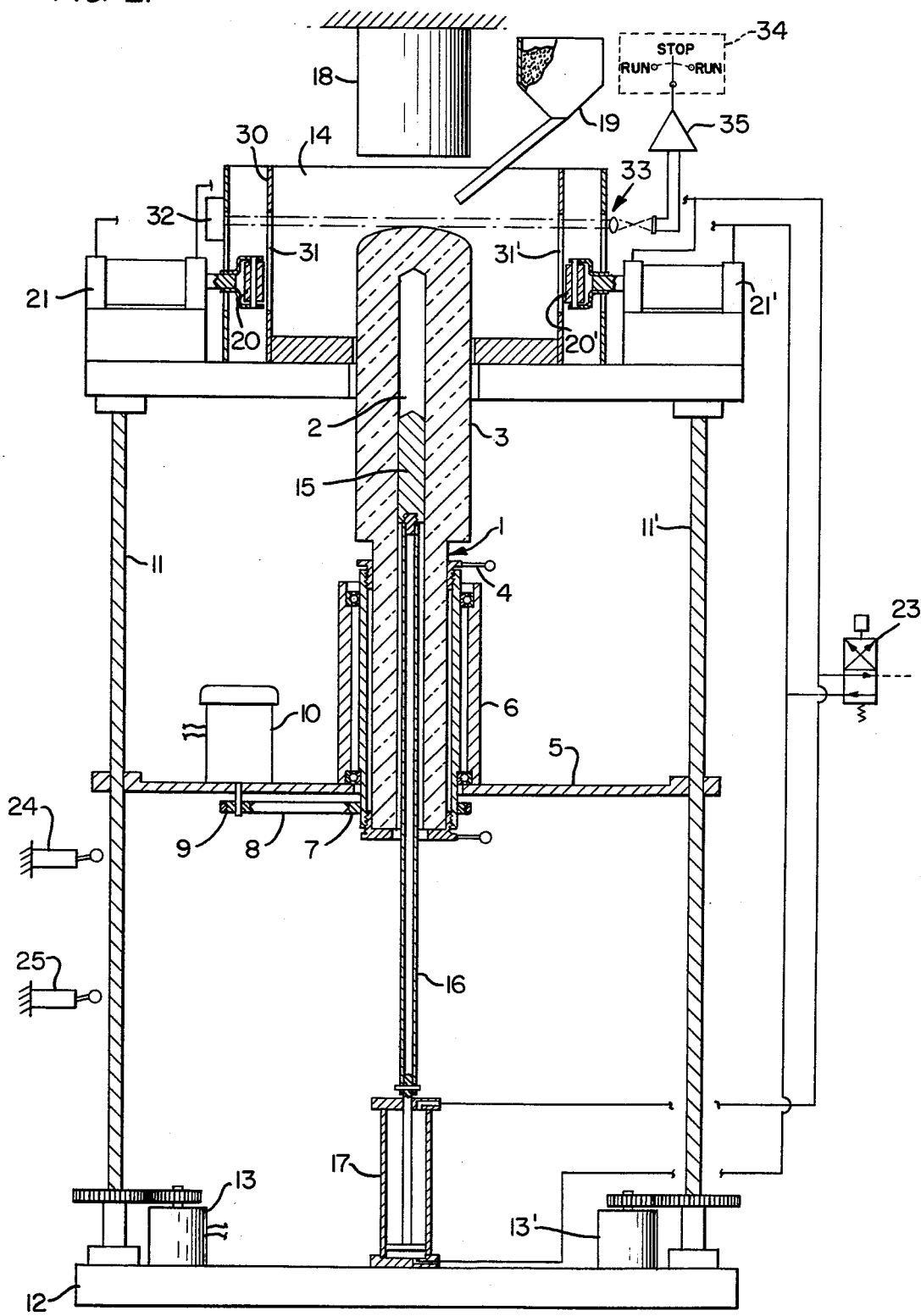
FIG. 2 is an elevational view, partially in cross-section, illustrating a preferred embodiment of the apparatus of the invention.

Operation of the forming tools of the present invention is illustrated by FIG. 1 wherein numeral 1 indicates a re-usable fused quartz or fused silica holder having the configuration of a hollow cylinder closed at one end and which serves for both the manufacture of hollow and solid ingots. The diameters of the bore 2 and of the outer surface 3 are identical with those of the ingot to be produced. As shown in FIG. 2 the holder 1 is fastened in a chuck 4 that is mounted on a platen assembly 5. The chuck is suitably rotated around its vertical axis in a bearing arrangement 6, which is connected through a sprocket 7, to a belt 8 and to another sprocket 9 which is driven by an electrical drive motor 10.

The platen assembly 5, is mounted on dual spindles 11 and 11' which are rigidly fastened into a frame 12, allowing the holder to be vertically raised and lowered with the help of electrically reversible drive motors 13 and 13'.

To operate the apparatus a re-usable holder 1 is mounted in the chuck 4 and the platen assembly 5 is raised within the frame 12 until the top of the holder has reached a predetermined position within the fusing chamber 14. The motors 13 and 13' will then be shut-off. A graphite or carbon mandrel 15, which is fastened to a hollow or a solid lance 16 is then inserted into the bore of the re-usable holder 1. The lance is rigidly attached to an air or fluid operated cylinder 17 which in turn is mounted on the bottom of the frame 12.

In this preferred starting position, the holder is suitably located at a predetermined distance from the stationary heating element 18, and the powder feed element 19. In this position two opposed, rotatably mounted graphite or carbon rollers 20 and 20' are each operatively connected to air or fluid operated cylinder 21 and 21' for reciprocating movement in a horizontal plane into and out of contact with the outer cylindrical end surface of the holder. With this arrangement all forming tools, inclusive of the rollers and the mandrel, are least subjected to the direct heating of the heating element when operating.

Numerous different types of heating devices may be employed for the purpose of supplying the heat required to grow the ingot and accordingly, no particular type of heating element is preferred or described here. However, it is noted that heating elements which produce various types of gas flames containing substantial amounts of hydroxyl groups or none at all are suitable, as are electrical resistance heaters and arc discharge devices. If a combustion heater is employed the hydroxyl content of the formed ingot can be regulated by choice of the fuel to the burner and by adjustment of the fuel to oxygen ratio.

After the heating element has operated for a few minutes and it has sufficiently preheated the end surface of the holder, the growing of the ingot can then be initiated by beginning the powder feed. While the temperature of the powder deposition surface is not particularly critical, it will generally range from approximately 2,000° to 2,200° C for quartz and fused silica. Again, there are numerous types of feeders suitable for the process. $SiO_2$ is now applied to the heated end surface of the holder at certain pre-established rates which result in an ingot of the desired quality.

The reversible drive motor 13 now rotates the spindle drive 11 so that the platen assembly is withdrawn at exactly the same rate at which the ingot is growing. After a sufficiently thick layer of $SiO_2$ has been deposited on the holder, a conventional timing device 22 will trigger the solenoid valve 23 to activate the air or fluid operated cylinders controlling the motion of the forming tools. They quickly move through openings 31 and 31' provided in the vertical wall portion 30 of the heating chamber and onto the freshly fused material as well as onto the original material, where they will remain in shaping contact for a predetermined period of time.

As the particulate quartz or fused silica is deposited, initially on the top surface of the holder 1 and subsequently on the top surface of the growing ingot, it is melted by the heat source 18. At predetermined time intervals the forming tools 20 and 20' move horizontally into contact with the melt, as illustrated in FIG. 1, to shape the melt thus forming a cylindrical ingot having an outer vertical surface of a diameter equal to that of the holder 1. Due to the rotation of the ingot and engagement with the forming tools, an exactly cylindrical and concentric section of the ingot will be formed each time, whereby excess material will be squeezed vertically upward, while the ingot continues to be lowered at the same time. Without application of the forming tools centrifugal force will cause the diameter of the melt to gradually increase. The contact between the forming tools 20 and 20' and the melt is intermittent. A preferred time for each period of contact is within the range of 2–10 seconds. Contact for forming is suitably repeated at 1 to 5 minute intervals. These time ranges will vary with the dimensions and design of the apparatus. Thus, this forming process lasts only a few seconds, during which the forming tools in contact with the hot melt will be heated slightly, but they are withdrawn from the heating chamber before reaching critical temperature. This critical temperature, for example, for graphite is about 1,200° C. In addition to graphite, other suitable materials for the forming tools include, for example, molybdenum, tungsten, iridium, etc. At or before this critical temperature is reached, the timing device will order them to return to their starting positions by reversing the pistons of the air or fluid operated cylinders. Having returned to these positions, the tools will dissipate the residual heat they absorbed during the forming process and will be cooled sufficiently before the next forming contact so that they will not exceed a tolerable temperature level. The life expectancy of the forming tools is thereby significantly increased.

In contacting the melt the lower portions of the forming tools also contact the solidified portion of the ingot (initially the holder) thereby stopping the inward movement of the forming tools and producing an ingot of constant outer diameter.

During the growth of the ingot the upper surface thereof is maintained at a constant predetermined distance from the heat source, which distance will depend on the heat output of the heat source, the desired rate of ingot growth, etc. In the preferred embodiment illustrated in FIGS. 2 and 3 this fixed distance is maintained by response to penetration (by the growing ingot) of a laser beam established between a laser 32 provided with an electronic chopper and a detector 33. Motors 13 and 13' are started and shut off by switch 34 responsive to signals received from the detector 33 and amplified by amplifier 35. It is to be understood that conventional means can also be used to maintain a proper distance between the top of the growing ingot and the heat source.

Figure 4:
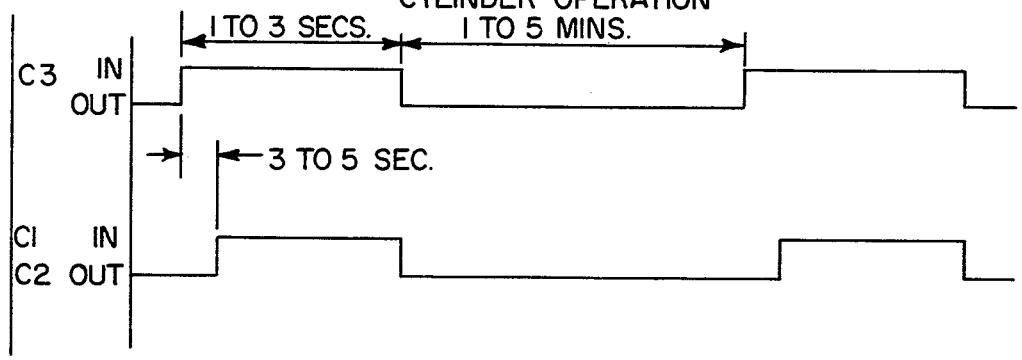
FIG. 4 is a graph showing the time sequence for forming tool and lance operation in a typical embodiment wherein the forming tools and lance tip are graphite and the ingot is formed from particulate fused silica or fused quartz.

To form the hollow bore in the ingot, a carbon mandrel 15 carried by a lance 16 is intermittently inserted through the holder 1 and into the melt by operation of cylinder 17. The mandrel 15 must be positioned within the ingot when the forming tools 20 and 20' are in contact with the ingot in order to maintain the diameter of the bore. Accordingly, operation of cylinders 21, 21' and 17 must be coordinated. A typical time sequence for cylinder operation is shown in FIG. 4.

The manufacture of a solid ingot is identical to the above described procedure with the exception that the forming mandrel 15 and the lance 16 are not employed.

A limit switch 24 will be activated when the platen 5 has reached a predetermined level at which the ingot has grown to its maximum length suitable for the frame. At this time, the SiO$_2$ feed, the heating element and the drive motors 10 and 13 are turned off in this order. Subsequently, the melt is lowered to an even lower position, contacting switch 25 and stopping platen 5. In this position the ingot can be removed from the chuck 4. Another holder can then be placed in the chuck, and a new melt will be started, repeating the above described procedure. The process may be conducted in an open atmosphere. Where combustion heating is employed, the atmosphere in which the fusion takes place is determined by the combustion gases employed in the heating element. The grain size for the silica feed is not very critical. Silica grains ranging from 2 mm. down to a fraction of a micron may be employed. Alternatively, the silica can be deposited from the vapor phase. A preferred powder size is approximately 100 microns average dimension.

Alternatively, the melt on the upper surface of the holder or support can be formed by a conventional vapor deposition technique, thus dispensing with the need for a powder feeder. For example, silica ingots can be formed by vapor deposition of SiO$_2$ on the deposition surface, as by hydrolyzation of SiCl$_4$ in a combustion gas flame, or through oxidation of SiCl$_4$ in a plasma flame.

Figure 3:
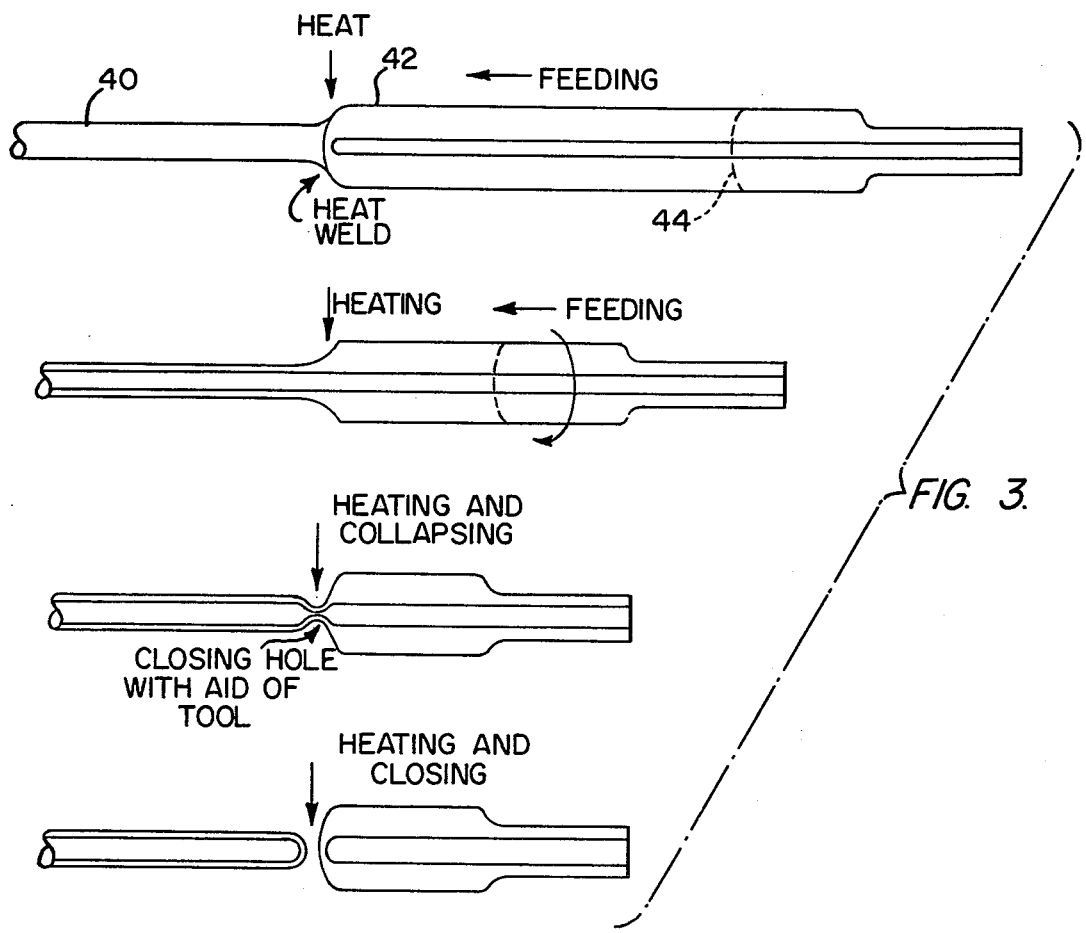
FIG. 3 illustrates the sequence of steps for pulling a formed silica ingot into 9 tube leaving the original ingot or form for reuse.

In the production of the ingot as described above the silica holder and the silica formed thereon become one integral ingot. This ingot can be pulled to form a tube in a conventional manner as illustrated in FIG. 3. In the sequence of steps illustrated in FIG. 3, a pulling tube 40 is heat welded to the end of the formed ingot 42 and ingot 42 is pulled into a tube down to the surface of the original holder 44. The original portion of the ingot can then be reused as the holder or form 1 as described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A method for forming a cylindrical silica ingot from a silica melt comprising:
    depositing silica initially onto the surface of a linearly movable cylindrical support of said silica and subsequently onto the surface of the ingot as the ingot is formed on said support;
    heating the deposited material with a heat source to melt said deposited material on said support or ingot;
    intermittently contacting the melt for predetermined time intervals, with at least one roller member forming tool to shape the melt into a cylinder having a smooth surface and a constant outer diameter without increasing said diameter during said forming, said deposited silica and said cylindrical silica support becoming an integral form as the melt solidifies; and
    moving said support as the ingot is formed to maintain a constant distance between the deposition surface and the heat source.

2. The method of claim 1 wherein said cylindrical support is moved vertically and at least two forming tools contact (1) the melt and (2) the cylindrical support or solidified silica to squeeze the melt vertically upward to form an ingot of a diameter equal to that of the cylindrical support.

3. The method of claim 1 wherein said ingot material is particulate fused silica or fused quartz and the surface upon which the ingot material is deposited is maintained at a temperature of 2,000° to 2,200° C.

4. The method of claim 1 in which a solid silica ingot is formed.

5. The method of claim 4 further comprising heating and melting a portion of said integral form and removing said melted portion by pulling into a rod, leaving the remaining portion for reuse as said cylindrical support.

6. The method of claim 1 wherein said cylindrical support is provided with a central longitudinal bore, said method further comprising:
intermittently moving a lance through said bore of said cylindrical support into said melt; and
while said lance is positioned in the melt, contacting said melt and said cylindrical support or solidified ingot with said forming tool thereby forming a cylindrical ingot having a hollow bore of a constant predetermined diameter.

7. The method of claim 6 further comprising heating and melting a portion of said integral form and removing said melted portion by pulling into a tube, leaving the remaining portion for reuse as said cylindrical support.

8. The method of claim 6 wherein said cylindrical support and said lance are moved vertically and wherein at least two forming tools reciprocate horizontally, contacting said melt and said cylindrical support or solidified ingot to squeeze said melt vertically upward thereby forming an ingot of a diameter equal to that of said cylindrical support.

9. A method for forming a cylindrical ingot from a melt of an ingot material comprising:
depositing said ingot material initially onto the top surface of a vertically movable cylindrical support and subsequently onto the surface of the ingot as the ingot is formed on said support;
heating the deposited material with a heat source to melt said deposited material on said support or ingot;
intermittently contacting the melt, for predetermined time intervals, with at least one roller member forming tool to squeeze the melt vertically upward and to shape the melt into a vertical cylinder having a smooth outer surface of a constant diameter without increasing said diameter during said forming; and
lowering said support as the ingot is formed to maintain a constant distance between the deposition surface and the heat source.

10. The method of claim 9 wherein at least two forming tools contact the melt and said cylindrical support or solidified ingot to squeeze the melt vertically upward to form an ingot of a diameter equal to that of the cylindrical support.

11. The method of claim 9 wherein said cylindrical support is of said ingot material whereby an integral form forms upon solidification of said melt and wherein said method further comprises heating and melting a portion of said integral form and removing said melted portion by pulling into a rod, leaving the remaining portion for reuse as said cylindrical support.

12. The method of claim 9 in which a solid ingot is formed.

13. The method of claim 9 wherein said cylindrical support is provided with a central longitudinal bore, said method further comprising:
intermittently moving a lance through said bore of said cylindrical support into said melt; and
while said lance is positioned in the melt, contacting said melt and said cylindrical support or solidified ingot with said forming tool thereby forming a cylindrical ingot having a hollow bore of a constant predetermined diameter.

14. The method of claim 13 wherein at least two forming tools reciprocate horizontally, contacting said melt and said cylindrical support or solidified ingot to squeeze said melt vertically upward thereby forming an ingot of a diameter equal to that of said cylindrical support.

15. The method of claim 13 wherein said cylindrical support is of said ingot material whereby an integral form forms upon solidification of said melt and wherein said method further comprises heating and melting a portion of said integral form and removing said melted portion by pulling into a tube, leaving the remaining portion for reuse as said cylindrical support.

* * * * *